United States Patent Office 3,433,812
Patented Mar. 18, 1969

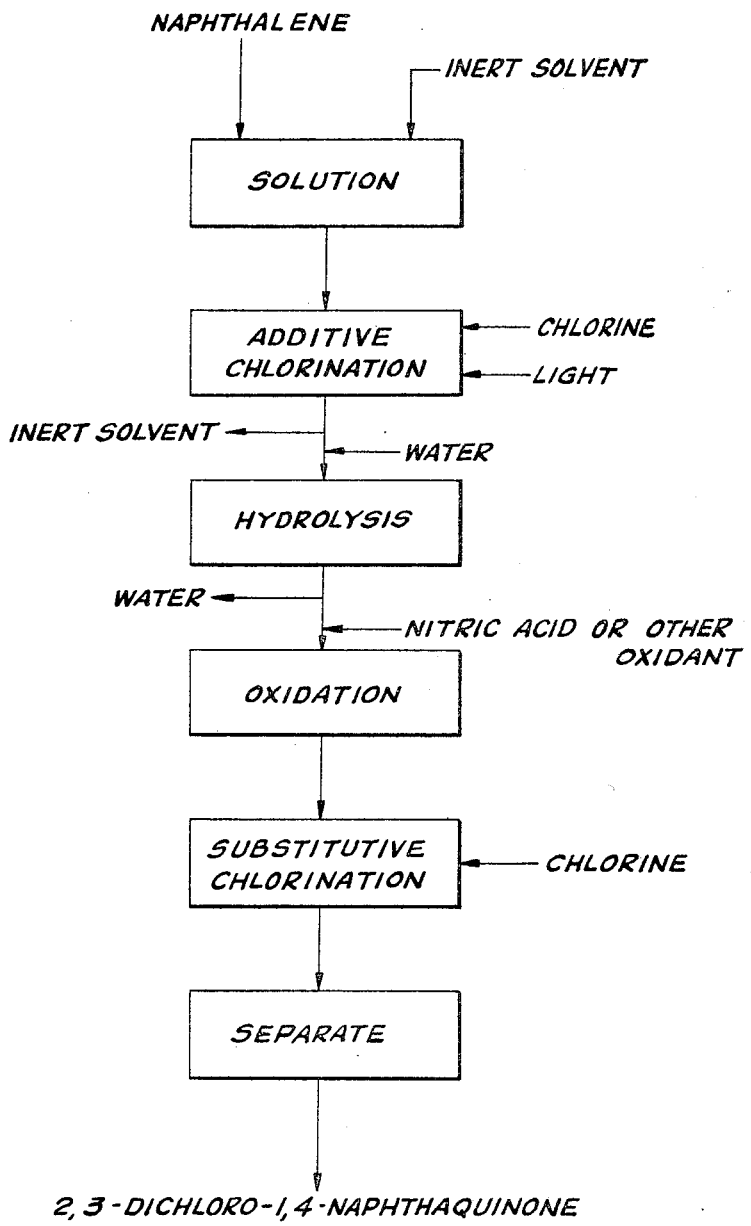

3,433,812
PREPARATION OF 2,3-DICHLORO-1,4-NAPHTHO-
QUINONE FROM NAPHTHALENE
Lloyd R. Buzbee, Pittsburgh, Pa., and George G. Ecke,
Akron, Ohio, assignors to Koppers Company, Inc., a
corporation of Delaware
Filed Mar. 17, 1966, Ser. No. 535,200
U.S. Cl. 260—396                                      5 Claims
Int. Cl. C07c 45/02, 49/66

ABSTRACT OF THE DISCLOSURE

The light catalyzed chlorination of naphthalene in an inert halogenated solvent at a temperature of 20–60° C. produces a substantially quantitative yield of 1,2,3,4-tetrachloro-1,2,3,4-tetrahydronaphthalene. Hydrolysis of the 1,2,3,4-tetrachloro-1,2,3,4-tetrahydronaphthalene by refluxing with water to produce 1,4-dihydroxy-2,3-dichloro-1,2,3,4-tetrahydronaphthalene followed by nitric acid oxidation results in the production of 2-chloro-1,4-naphthoquinone which is chlorinated to produce a useful fungicide, 2,3-dichloro-1,4-naphthoquinone.

---

This invention relates generally to the preparation of chlorinated naphthoquinones from naphthalene.

Specifically, it relates to the production of 2,3-dichloro-1,4-naphthoquinone.

2,3-dichloro-1,4-naphthoquinone is used as a wood preservative and in dyestuffs. The most frequent use is as a fungicide. Also useful as a fungicide is one of the intermediates in our process, 2-chloronaphthoquinone, which is also a bacteriostat and a mold preventative.

Previous processes for preparing 2,3-dichloro-1,4-naphthoquinone have involved the chlorination of 1,4-naphthoquinone, α-naphthol and 4-substituted α-naphthols, α-naphthylamine and 4-substituted α-naphthylamine and α-naphthylamine-2,4-disulfonic acid, which all involve the use of costly starting materials and processing, thus causing the price of this useful compound to be relatively high.

We have found that surprisingly if a carefully controlled chlorination of naphthalene under specified conditions is carried out, a virtually quantitative yield of 1,2,3,4-tetrachloro-1,2,3,4-tetrahydronaphthalene can be produced which will be highly predominant in certain isomeric structures which enable ready reaction of the crude 1,2,3,4-tetrachloro-1,2,3,4-tetrahydronaphthalene product by the steps of hydrolysis to 1,4-dihydroxy-2,3-dichloro-1,2,3,4-tetrahydronaphthalene, oxidation to 2-chloro-1,4-naphthoquinone and substitutive chlorination to give 2,3-dichloro-1,4-naphthoquinone.

In accordance with the present invention 2,3-dichloro-1,4-naphthoquinone is prepared from naphthalene by a process which involves the chlorination of naphthalene under conditions which yield a substantially quantitative yield of 1,2,3,4-tetrachloro-1,2,3,4-tetrahydronaphthalene, hydrolysis of the 1,2,3,4-tetrachloro-1,2,3,4-tetrahydronaphthalene in the presence of water to form 1,4-dihydroxy-2,3-dichloro-1,2,3,4 - tetrahydronaphthalene, oxidation of said 1,4-dihydroxy-2,3-dichloro-1,2,3,4-tetrahydronaphthalene to produce 2-chloronaphthoquinone and chlorination of the 2-chloronaphthoquinone to produce 2,3-dichloro-1,4-naphthoquinone.

In our process, the gaseous chlorination of naphthalene to produce a near quantitative yield of 1,2,3,4-tetrachloro-1,2,3,4-tetrahydronaphthalene composed of specific isomeric forms, strict adherence must be made to the reaction conditions employed. The chlorination

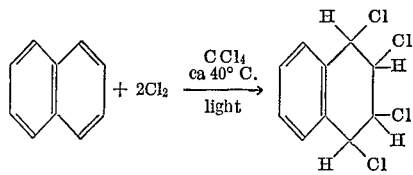

is carried out with gaseous chlorine being passed into a solution of naphthalene in carbon tetrachloride or other suitable inert halogenated solvent, in the presence of light as a catalyst and at a temperature of about 40° C. Six geometric isomers for the compound 1,2,3,4-tetrachloro-1,2,3,4-tetrahydronaphthalene exist due to various possible steric configurations of 1,2,3,4-tetrachloro-1,2,3,4-tetrahydronaphthalene. The naphthalene chlorination reactions of the prior art have usually resulted in the preparation of substantial amounts of the isomeric constituent which melts at 182° C. This isomer is subject to further reactions only with great difficulty.

The novel chlorination reaction of our present invention results in the production of four isomeric 1,2,3,4-tetrachloro - 1,2,3,4 - tetrahydronaphthalenes, which comprise an isomer melting at 98° C., an isomer melting at 133° C., a novel isomer which melts at 87° C., and an unknown isomeric constituent which has not been identified by melting point. This fourth isomer can be found in the mixture by analysis but attempts to isolate it in pure form and determine its melting point have been unsuccessful and thus it is herein designated as the "unknown" isomer, its melting point not yet established. Our chlorination reaction results in the production of greater than 75% of the 98° C. and 133° C. melting point isomers which are readily reacted for the purpose of subsequent hydrolysis or other reactions. In our novel chlorination, none of the 182° C. isomer is produced .

The chlorination reaction of our invention requires that an inert organic solvent be used. Such solvent must, itself, be difficultly chlorinated with respect to naphthalene and yet dissolve the naphthalene. Suitable solvents are carbon tetrachloride, chlorobenzene, dichlorobenzene, nitrobenzene, trichloroethylene, perchloroethane, and other negatively substituted benzene solvents. It is advantageous that the solvent be more volatile than tetrachloro-1,2,3,4-tetrahydronaphthalene to permit the ready separtaion of the tetrachloro-1,2,3,4-tetrahydronaphthalene from solvent by distillation.

The temperature used in the chlorination step of our process is maintained between about 20–60° C. The chlorination reaction is highly exothermic and cooling is usually necessary for maintaining the temperature within this range. It is possible to regulate the amount of various isomeric tetrachloro - 1,2,3,4 - tetrahydronaphthalene by varying the temperature of the chlorination reaction. For example, at about 20° C. almost 40% of the unknown isomer is produced while at 40° and 60° C. substantially none is produced. The temperature is also preferably held between 20° C. and 60° C. because of the economics of such a temperature range. The use of a lower temperature would require substantial cooling of the reaction mass and the use of higher temperatures increases the danger of substitutive chlorination and resultant by-products.

The ratio of solvent to naphthalene has been found to have an effect upon the addition reaction and the isomeric distribution in the product. Normally, our process results in a substantially total addition reaction with no substitution reaction taking place. At the lower amount of solvent, a noticeable amount of a substitution reaction takes place which results in a less desirable product. The use of a large amount of solvent is also a disadvantage in that it increases the amount of material which needs to be processed and also in the fact that a lesser amount of the desired isomers is produced. For example, the use of about 200 milliliters of carbon tetrachloride per mole of naphthalene to be reacted results in an increased amount of a substitution reaction taking place. A ratio of solvent to naphthalene of 870 ml./mole results in a decrease in the amount of desirable 98° C. and 133° C. melting point isomers, with only about 60% of these preferred isomers being produced. We have found that the use of about 250 milliliters of solvent per mole of naphthalene is preferred.

Light is the only suitable catalyst found for our chlorination reaction. The light used is of such a wavelength as to generate free radical chlorine by radiation. A commercially available sunlamp may be used. The use of peroxides has been found to be ineffective in our process. For example, benzoyl peroxide was found to give about 13% of a substituted product rather than the desired addition product.

The chlorination reaction must be carried out in an inert atmosphere composed preferably of nitrogen or argon or other inert materials which do not inhibit the free radical reaction. The slightest amount of free oxygen in the chlorination atmosphere causes the reaction to become sluggish and the presence of unreacted chlorine may be readily detected by a greenish color in the reaction mixture. The chlorine may be fed to the naphthalene solution at a rapid rate with immediate reaction of the chlorine, as evidenced by the absence of any greenish cast to the reaction mixture.

The reaction time for the chlorination reaction may vary. As previously stated the chlorine reacts under these designated conditions as rapidly as it is fed to the naphthalene solution and the reaction is quite exothermic. Thus the minimum reaction time would depend upon the ability to maintain the desired reaction temperature through adequate removal of the heat of reaction. The use of a longer reaction time does not have an unfavorable effect upon the reaction but could be economically undesirable due to production costs.

Atmospheric pressure is preferred for the chlorination reaction.

Our process employs the crude reaction mass formed from the chlorination of naphthalene in the subsequent reaction steps to produce 2,3 dichloro-1,4-naphthoquinone. A suitable method for removing the solvent from the reaction product is to pour the solution of tetrachloro-1,2,3,4-tetrahydronaphthalene into boiling water whereby the carbon tetrachloride volatilizes and the reaction mass is ready for immediate hydrolysis.

The reaction product is usually found to be in the form of solution of 1,2,3,4-tetrachloro-1,2,3,4-tetrahydronaphthalene in the solvent employed, however, the use of lower amounts of solvents will sometimes result in a slurry which does not however affect the yield of 1,2,3,4-tetrachloro-1,2,3,4-tetrahydronaphthalene.

The hydrolysis step of our invention

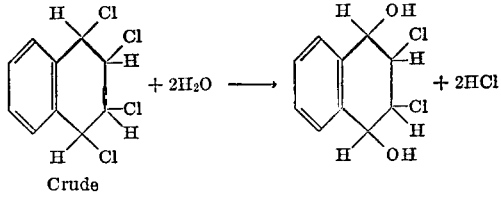

Crude is readily carried out by the refluxing of a mixture of the crude 1,2,3,4-tetrachloro-1,2,3,4-tetrahydronaphthalene prepared by our preferred chlorination process in the presence of an amount of water equal to or less than about one molar concentration. The crude 1,2,3,4-tetrachloro-1,2,3,4-tetrahydronaphthalene is a liquid at the boiling point of the water and the reaction mass is in the form of an emulsion. Thus it is advantageous to use an emulsifying agent in minor amounts and an adequate rate of stirring in order to provide the optimum amount of contact between the 1,2,3,4-tetrachloro-1,2,3,4-tetrahydronaphthalene and the water.

Our chlorination reaction produces virtually quantitative yields of tetrachloro-1,2,3,4-tetrahydronaphthalene, which results in the absence of any chloronaphthalenes or dichloronaphthalenes which would inhibit the hydrolysis of the product. Also, the quantitative yield, resulting in the absence of any organic byproducts enables the reaction product to be readily hydroylzed.

The chlorination reaction, resulting in the absence of any of the 182° isomer, is excellently suited for the subsequent hydrolysis step, as evidenced by the fact that the 182° isomer of tetrachloro - 1,2,3,4 - tetrahydronaphthalene is found to have a reaction rate about three times slower than the reaction rates of the 98° and 133° isomers produced in predominance in our process. Thus there is available throughout chlorination about 75 percent or more of the readily hydrolyzed 98° and 133° isomers of 1,2,3,4-tetrachloro-1,2,3,4-tetrahydronaphthalene.

A higher temperature than the normal reflux temperature for the hydrolysis step can be obtained by the use of a pressurized system. However, we have found that such pressurized equipment is not necessary.

The crude 1,2,3,4-tetrachloro-1,2,3,4-tetrahydronaphthalene product is hydrolyzed by refluxing with water for about 15 to 30 hours for complete reaction of the 1,2,3,4-tetrachloro-1,2,3,4-tetrahydronaphthalene to produce 1,4-dihydroxy-2,3-dichloro-1,2,3,4-tetrahydronaphthalene.

After the hydrolysis of the crude 1,2,3,4-tetrachloro-1,2,3,4-tetrahydronaphthalene produced by our preferred chlorination process to the resulting 1,4-dihydroxy-2,3-dichloro - 1,2,3,4 - tetrahydronaphthalene, the reaction mass is oxidized to 2 - chloro-1,4-naphthoquinone. The crude 1,4-dihydroxy-2,3-dichloro-1,2,3,4-tetrahydronaphthalene which is a solid at room temperature need not be purified before the subsequent oxidation reaction.

Nitric acid is the preferred oxidant to be used in the preparation of 2-chloro-1,4-naphthoquinone from 1,4-dihydroxy-2,3-dichloro - 1,2,3,4 - tetrahydronaphthalene but the process is not necessarily limited to the use of this oxidant. Other oxidants useable in our process are nickel peroxide, various hypochlorites potassium dichromate, perchlorates, and chlorine itself.

In the nitric acid oxidation

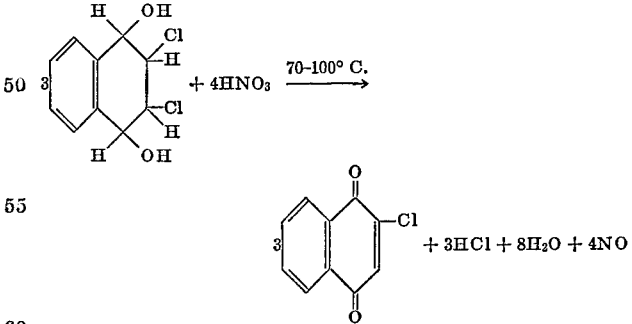

nitric acid which is too concentrated will lead to nitration of the starting material at the expense of the desired product; concentrations of about 40 percent aqueous nitric acid are preferred. The use of excess nitric acid is desired to reach a good reaction rate. A solvent is not necessary in the oxidation step.

The reaction temperature employed during the oxidation step is maintained between about 70–100° C., preferably 90–100° C. The use of lower reaction temperatures results in decreased reaction rate, and higher temperatures will cause overoxidation of the product and the preparation of phthalic acid or other undesired by-products. The time of reaction should be limited to that which will produce the desired 2-chloro-1,4-naphthoquinone without overoxidation to undesired products.

As previously stated, the 2-chloro-1,4-naphthoquinone thus produced is itself a useful compound. However, for the preparation of 2,3-dichloro-1,4-naphthoquinone this compound must be chlorinated, and the crude 2-chloro-1,4-naphthoquinone may be used.

The chlorination of 2-chloro-1,4-naphthoquinone

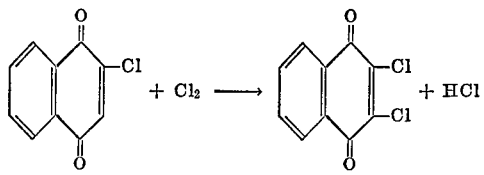

is readily carried out by many known substitutive chlorination processes. A suitable process is described by K. Brass and L. Kohler, Ber., 55, 2554 (1922). The reaction involves the contracting of a heated solution of 2-chloro-1,4-naphthoquinone in acetic acid, in the presence of iodine, with gaseous chlorine. The reaction mass on completion of the reaction is cooled and the precipitated 2,3-dichloro-1,4-naphthoquinone filtered.

There has thus been described a novel process for the preparation of 2,3-dichloro-1,4-naphthoquinone with crude naphthalene as a starting material.

The process of our invention is schematically illustrated in the accompanying drawing by flow diagram.

Our invention is further illustrated by the following examples:

EXAMPLE I

Additive chlorination of naphthalene

To a 3-neck round bottom flask equipped with a stirrer there was added 384.5 grams (3.0 moles) of naphthalene (sodium refined) and 750 milliliters of carbon tetrachloride, technical grade. The flask was equipped with a thermometer, a chlorine inlet which extended well below the surface of the charge, and a reflux condenser which exhausted through a T into which a slow stream of nitrogen was fed. The T in turn exhausted into a water scrubber in which any evolved HCl would be absorbed. The reaction flask was purged with nitrogen before beginning the reaction. Gaseous chlorine was introduced from a weighed lecture bottle, through a flow meter, and at a constant rate. During the addition of the chlorine to the stirred reaction mass, 212.8 grams (6.0 moles) during 125 minutes, the reaction mixture was illuminated with a sunlamp (General Electric) and the reaction temperature was held at 39–42° C. by use of an ice bath. The mixture was stirred and illuminated an additional 10 minutes after the addition of the chlorine. The product, crude 1,2,3,4-tetrachloro-1,2,3,4-tetrahydronaphthalene was recovered by distilling the reaction mixture to a pot temperature of 50° C. at a pressure of ca. 0.1 millimeter mercury, to remove the carbon tetrachloride solvent and leave the product as residue. About 0.23 mole of HCl was trapped in the scrubber which corresponds to about 3.8% of a substitution reaction.

The 1,2,3,4-tetrachloro - 1,2,3,4-tetrahydronaphthalene corresponded to a 99% yield and analyzed: 36% isomer melting at 98° C., 32% isomer melting at 133° C., 28% isomer melting at 87° C., and 4% unknown. No trace of the isomer of tetrachloro - 1,2,3,4-tetrahydronaphthalene melting at 182° C. was found.

EXAMPLE II

The procedure of Example I was followed except that chloroform was used as the solvent for the reaction. The reaction was carried out at 40–42° C., using light as a catalyst. Analysis showed that about 26% of a substitution reaction rather than the desired addition reaction had occurred, thus evidencing the importance of solvent selection in the process.

EXAMPLE III

Hydrolysis of isomeric mixture of 1,2,3,4-tetrachloro-1,2,3,4-tetrahydronaphthalene To a flask equipped with a stirrer and a reflux condenser was added 3.5 liters of water containing 1.0 gram of a surface active agent (Aliquot-6 General Mills Company). To the mixture was added 372 grams (1.38 moles) of crude isomeric mixture of 1,2,3,4-tetrachloro-1,2,3,4-tetrahydronaphthalene (Example I). The stirred mixture was refluxed and at the end of 17 hours, 81% of the theoretical HCl was found to have been formed. Upon completion of the hydrolysis and cooling of the mixture, the crude product was obtained by decanting the water from the organic solid and extracting the water phase with ether. Upon distillation of the ether from the product, the combined solid products corresponded to a 95% yield of crude 1,4-dihydroxy - 2,3-dichloro - 1,2,3,4-tetrahydronaphthalene based on the naphthalene charged to the chlorination reaction of Example I.

EXAMPLE IV

Hydrolysis of various 1,2,3,4-tetrachloro-1,2,3,4-tetrahydronaphthalene isomers

Experiments were made in which the rate of hydrolysis of the individual isomers of 1,2,3,4-tetrachloro-1,2,3,4-tetrahydronaphthalene was determined. Samples of the various isomers, 21 grams, were refluxed for 10 hours in 800 milliliters of water containing 0.072 gram of Aliquot 6 surface active agent (palmityl trimethyl ammonium chloride, General Mills Company). The degree of hydrolysis to 1,4-dihydroxy - 2,3-dichloro - 1,2,3,4-tetrahydronaphthalene was determined by titrating a 2 ml. sample of the hydrolysis mixture with 0.1 N sodium hydroxide. The results are listed in Table I:

Table I.—Hydrolysis after 10 hours reflux of 1,2,3,4-tetrachloro-1,2,3,4-tetrahydronaphthalene isomers

| Isomer (designated by) (melting point ° C.): | Percent hydrolysis |
| --- | --- |
| 133 | 100 |
| 98 | 100 |
| 87 | 46 |
| 182 | 48 |

It is readily apparent that the production of higher percentages of the 133° C. and 98° C. isomers enable speedy subsequent hydrolysis. The 182° C. isomers is much slower to react. The 87° C. is also slow but is found in small amounts and thus tolerable.

EXAMPLE V

Oxidation of 1,4-dihydroxy-2,3-dichloro-1,2,3,4-tetrahydronaphthalene to 2-chloro-1,4-naphthoquinone To a 500 milliliter round bottom flask equipped with stirrer, thermometer and reflux condenser was added 23.3 grams (0.10 mole) of 1,4-dihydroxy-2,3-dichloro-1,2,3,4-tetrahydronaphthalene (Example 3). There was then added a solution of 78 milliliters (1.2 moles) of 70% concentration nitric acid and 78 milliliters of water (to give 40% concentration of acid) and 3.5 milliliters of concentrated hydrochloric acid. The mixture warmed to 40° C. The mixture was then heated to 94° C. with stirring during six minutes, whereupon a strong evolution of nitrogen dioxide commenced. The mixture was stirred and held at 94–95° C. for 15 minutes, the nitrogen dioxide evolution subsided, and rapidly cooled by means of an ice bath to 30° C. during four minutes. The mixture was diluted to about 400 milliliters with water and the insoluble product filtered, yielding 15.1 grams (78% yield based on 1,4-dihydroxy - 2,3 - dichloro-1,2,3,4-tetrahydronaphthalene) of solid melting at 93–104° C. The solid on recrystallization from methanol melted at 114–115° C. and analyzed as 2-chloro-1,4-naphthoquinone.

EXAMPLE VI

Substitutive chlorination of 2-chloro-1,4-naphthoquinone

To a flask equipped with a stirrer, thermometer, reflux condenser and gas inlet tube was added 12.2 grams (0.06 mole) of 2-chloro-1,4-naphthoquinone (crude oxidation product of Example 5), 90 milliliters of acetic acid.

The mixture was stirred and heated to 80° C. to form a solution and 4 grams of iodine crystals were added. The resulting solution was immediately saturated with gaseous chlorine and heated to and held at 110–115° C. for 1.5 hours. The chlorine was added below the surface of the mixture at such a rate that some chlorine was exhausted from the reactor throughout the reaction period. The solution was cooled with an ice bath to 25° C. and the precipitated solid, 2,3-dichloro-1,4-naphthoquinone, separated by filtration, melted at 193° C. The filtrate was concentrated (60–70° C./10.5 millimeters mercury) to yield further solid product. The combined products corresponded to an 80% yield of 2,3-dichloro-1,4-naphthoquinone based on 2-chloronaphthoquinone.

We claim:

1. Process for preparing 2,3-dichloro-1,4-naphthoquinone from naphthalene comprising:
   forming a solution of naphthalene in an inert halogenated solvent
   contacting said solution at a temperature of 20–60° C. with about two moles of gaseous chlorine per mole of naphthalene in said solution while exposing said solution to light, to produce 1,2,3,4-tetrachloro-1,2,3,4-tetrahydronaphthalene,
   separating said 1,2,3,4 - tetrachloro-1,2,3,4-tetrahydronaphthalene from said solvent and hydrolyzing said 1,2,3,4-tetrachloro-1,2,3,4-tetrahydronaphthalene by refluxing with water to produce 1,4-dihydroxy-2,3-dichloro-1,2,3,4-tetrahydronaphthalene,
   heating a mixture said 1,4-dihydroxy - 2,3 - dichloro-1,2,3,4-tetrahydronaphthalene with an excess of nitric acid to a temperature of 70–100° C. so that said 1,4-dihydroxy-2,3-dichloro - 1,2,3,4 - tetrahydronaphthalene is oxidized to 2-chloro-1,4-naphthoquinone,
   chlorinating said 2-chloro-1,4-naphthoquinone by passing chlorine gas therethrough to produce 2,3-dichloro-1,4-naphthoquinone.

2. The process of claim 1 wherein said solvent is carbon tetrachloride.

3. The process of claim 2 wherein the ratio of carbon tetrachloride to naphthalene in said solution is about one quarter liter of carbon tetrachloride per mole of naphthalene.

4. Process for preparing a substantially quantitative yield of 1,2,3,4-tetrachloro-1,2,3,4-tetrahydronaphthalene characterized by the absence of any of the 1,2,3,4-tetrachloro-1,2,3,4-tetrahydronaphthalene isomer that melts at 182° C. comprising:
   contacting a solution of naphthalene in an inert halogenated solvent, at a temperature of 20–60° C. with about two moles of gaseous chlorine per mole of naphthalene in said solution while exposing said solution to light, to produce 1,2,3,4-tetrachloro-1,2,3,4-tetrahydronaphthalene.

5. Process for preparing 2-chloro-1,4-naphthoquinone from naphthalene comprising:
   forming a solution of naphthalene in an inert solvent,
   contacting said solution at a temperature of 20–60° C. with about two moles of gaseous chlorine per mole of naphthalene in said solution, while exposing said solution to light, to produce 1,2,3,4-tetrachloro-1,2,3,4-tetrahydronaphthalene,
   separating said 1,2,3,4-tetrachloro - 1,2,3,4 - tetrahydronaphthalene from said solvent and hydrolyzing said 1,2,3,4-tetrachloro-1,2,3,4-tetrahydronaphthalene by refluxing with water to produce 1,4-dihydroxy-2,3-dichloro-1,2,3,4-tetrahydronaphthalene,
   heating a mixture of said 1,4-dihydroxy-2,3-dichloro-1,2,3,4-tetrahydronaphthalene with an excess of nitric acid to a temperature of 70–100° C. so that said 1,4-dihydroxy-2,3-dichloro - 1,2,3,4 - tetrahydronaphthalene is oxidized to 2-chloro-1,4-naphthoquinone.

References Cited

UNITED STATES PATENTS 1,933,422  10/1933  Englehardt _____ 260—650

DANIEL D. HORWITZ, *Primary Examiner.*

U.S. Cl. X.R.

167—32; 204—163; 260—618, 650, 999